Sept. 26, 1939.　　　　J. E. BEGGS　　　　2,174,375
GLASS-TO-METAL SEAL
Original Filed Sept. 15, 1934
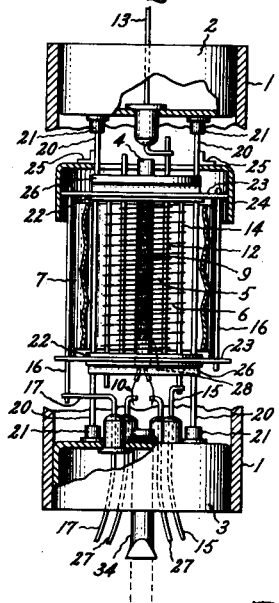
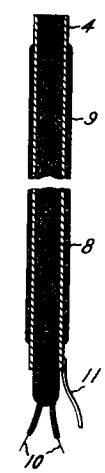
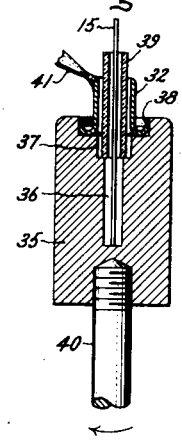
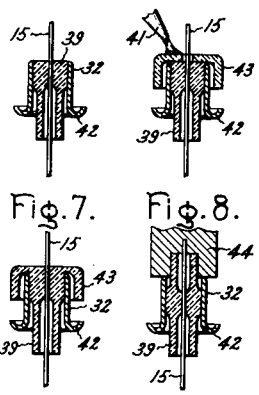
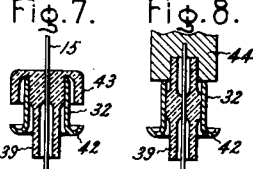
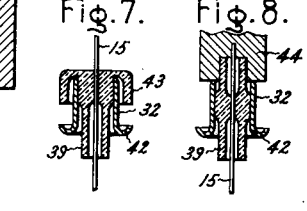
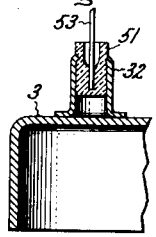
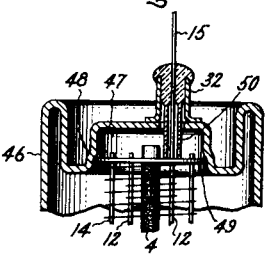
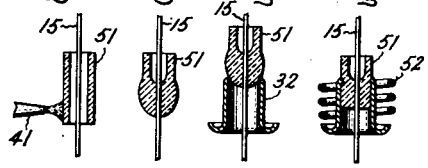
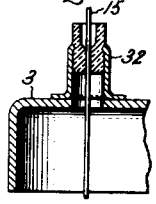
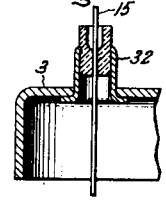
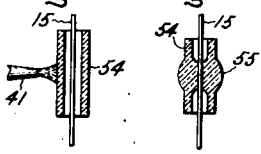
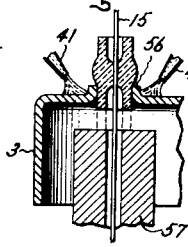
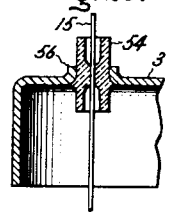
Inventor:
James E. Beggs,
by Harry E. Dunham
His Attorney.

Patented Sept. 26, 1939

2,174,375

UNITED STATES PATENT OFFICE 2,174,375

GLASS-TO-METAL SEAL

James E. Beggs, Scotia, N. Y., assignor to General Electric Company, a corporation of New York Original application September 15, 1934, Serial No. 744,165. Divided and this application March 30, 1937, Serial No. 133,850

3 Claims. (Cl. 250—27.5)

This application is a division of my application Serial No. 744,165 filed September 15, 1934, and assigned to the General Electric Company.

The present invention relates to glass-to-metal seals employed in electrical devices such, for example, as radio tubes.

It is an object of the invention to provide an improved method and means for forming lead-in seals through metal wall parts. To this end the invention includes the steps of perforating such a wall part; extending the metal around the opening thus formed to provide an integral eyelet, and supporting a lead-in conductor within such eyelet by means of a fused vitreous material, preferably glass.

For the sake of completeness of disclosure, the description provided in the following includes certain features which are claimed in my aforesaid prior application Serial No. 744,165. However, it should be understood that the claims of the present application are directed only to the method specified in the preceding paragraph and to the form of seal resulting from such method.

Other objects of the invention will be apparent as the specification is perused in connection with the accompanying drawing in which Fig. 1 is a view, partly in section, of a thermionic device improved in accordance with the present invention and embodying some of the improved seals; Fig. 2 is a sectional view of a preferred form of cathode employed in the tube shown in Fig. 1; Fig. 3 is an enlarged fragmentary sectional view of a typical seal employed in the tube shown in Fig. 1; Figs. 4, 5, 6 and 7 illustrate the progressive steps in the fabrication of another form of improved seal; Fig. 8 shows a method of making a modified form of seal; Fig. 9 shows a still different form of the improved seal; Figs. 10, 11, 12 and 13 illustrate the progressive steps in the manufacture of another form of seal; Figs. 14 and 15 show various ways of securing the seal illustrated in Fig. 13 to a metal envelope; Fig. 16 shows a seal similar to that illustrated in Fig. 14 but employed in connection with an insulated support member instead of a leading-in conductor; Figs. 17, 18 and 19 illustrate the successive steps employed in the fabrication of the seal shown in Fig. 20.

In Fig. 1, which illustrates only one of the many types of all-metal tubes in which the improved seals may be employed to advantage, numeral 1 designates a cylinder consisting of any readily workable, inexpensive metal, such as iron, nickel, etc., which is closed at the top (as shown) by a metal header member 2 and at the bottom by a metal header member 3. Each of these headers conveniently takes the form of a reentrant cylindrical member fitting snugly within the interior of the envelope 1 to which it may be secured in any suitable and well-known manner, for example, by welding.

The interior assembly of the tube is illustrated as taking the form of a four-electrode device having a cathode 4, an electrostatic control grid 5, a screen grid 6 and an anode 7, all preferably of cylindrical configuration and surrounding one another. While any suitable type of cathode may be used, I prefer to employ an indirectly heated cathode of the type shown in Fig. 2. In this figure, numeral 8 designates a tungsten heater which may take the form of a "hairpin," insulatingly mounted within the cylinder 4 which is preferably of nickel, and constitutes the cathode proper. The cylinder 4 advantageously may be coated with electronically active material 9, such as barium and strontium oxide, obtained initially from the carbonate, as is well known in the art. Leads 10 may be taken from both ends of the heater and a lead 11 connected to the lower end (as shown) of the cathode cylinder.

The grid or electrostatic control member 5 may consist of a circular wire helix, wound on a pair of metal uprights 12, one of which, the extreme right-hand member as shown, is extended and joined to a leading-in conductor 13 taken out through the upper end of the tube.

The screen grid 6 may also consist of a helix but of larger diameter than the control grid, and wound on a pair of metal uprights 14. One of these uprights may be extended to connect with a leading-in conductor 15.

The anode 7 may consist of a metal cylinder, preferably of nickel, and provided at diametral positions with a pair of rod uprights 16, one of which, the left-hand rod as shown, is extended and connected to a leading-in conductor 17.

The electrode structure as a whole is mounted on a frame constituted of a pair of metal uprights 20 which are secured by flanged metal collars 21 to the upper and lower headers 2, 3.

The control grid uprights 12 and the screen grid uprights 14 are spaced and maintained in proper position by means of a pair of disks 22, of insulating material such as mica, which contain openings for snugly receiving the uprights. On the upper side of the upper disk 22 and the lower side of the lower disk 22, there is a pair of disks 23, also of mica but of larger diameter than the disks 22. The disks 23 have openings about the periphery to receive the anode uprights 16.

The upper disk 23 is of a diametral size such as to fit snugly within a metal cap member 24, the purpose of which will be explained hereinafter. The cap 24 is provided with a slot (not shown but indicated by the lack of cross-sectional lines along the flattened portion of the member), sufficiently large to permit the control grid leading-in conductor and the cathode to pass through without touching. The frame members 20 also pass through the slot and are rigidly secured to the cap member 24 by angle pieces 25.

In order to maintain the mica disks 22 and 23 perfectly flat, i. e., to prevent warp, and in order to offer more rigidly to the supporting framework, I have provided at each end of the electrode structure, transverse metal bars 26 which are respectively secured to each pair of mica disks 22, 23, for example, by riveting, and also secured as by welding, to the frame uprights 20. Each of these bars is provided with a transverse slot corresponding to the slot in the cap 24 in order to permit the upper ends of the control grid uprights 12, also the upper end of the cathode cylinder 4, and the lower ends of the screen grid uprights 14, and the lower end of the cathode 4, to pass through without contacting with the bars.

The control grid leading-in conductor 13 is taken out through the upper header 2 by means of an improved seal which constitutes the subject of the present invention and which will be described presently. Leading-in conductor 17 of the anode, conductor 15 of the screen grid and conductors 27 of the heater member are taken out through the opposite header 3, also by means of improved seals. There is no leading-in conductor for the cathode 4 but there is a conductor 28 provided between the cathode and the metal bar 26 which is electrically connected to the cylinder 1 through the frame uprights 20.

It will be apparent that inasmuch as the envelope 1 or outer container is electrically connected to the cathode 4, hence is at the same potential, the envelope, in addition to serving as a cathode conductor, also serves as an exterior screen electrode for intercepting electrostatic lines of force which normally pass between the upper or lower edge of the control member or its leading-in conductor and the upper or lower edge of the anode or its leading-in conductor. The cap member 24 serves to increase this screening effect by intercepting the electrostatic lines of force which tend to pass between the leading-in conductor 13 of the control grid and the outer surface of the anode.

For bringing out the various leading-in conductors through the metal headers 2, 3, specially designed seals are employed, examples of which are shown in Figs. 3, 5, 7, 8, 9, 14, 15 and 20 of the drawing. The seal specifically illustrated in the tube assembly of Fig. 1 is shown in Fig. 3 in an enlarged sectional view. As shown, openings are provided in the header at positions where it is desired to pass the leading-in conductors, and secured to each header at the respective openings, for example by welding, there is a metal eyelet 32 provided at one end (at the bottom as shown) with an outwardly extending flange in order to be secured, either to the under side or the upper side of the header member. There is a globule, bead, or cylinder 33 of glass or other vitreous material within the eyelet which may support and insulate any one of the leading-in conductors or support rods from the eyelet, and hence from the header member. A hermetic seal is formed between the conductor, the glass and the eyelet, preferably by means of a gas flame which is directed at the proper position on the eyelet after the conductor and bead have been assembled in the eyelet. The seal, including the conductor, glass and eyelet members, is completed as a unit, apart from the header member, after which the eyelet is secured as by welding to the header.

In order to insure an absolutely vacuum-tight seal between the glass 33, the eyelet 32 and the conductor 15, these members should preferably have substantially the same thermal expansion characteristic over the entire temperature range between 0° C. and the softening temperature of the glass. Thus, no stress or strain is introduced at the various joints during fabrication of the seal or during any subsequent heat treatment of the tube which contains the seal. While various metals and glasses may be employed for this purpose, the freedom from stress and strain at the seal being dependent upon the amount of the materials involved and the respective differences of thermal expansion at the various temperatures reached during manufacture, I prefer to employ materials which have been disclosed and claimed in the Burger and Hull Patent No. 2,071,196, granted February 16, 1937, and assigned to the same assignee as the present invention. As pointed out in the said Burger and Hull patent, a metal which may be advantageously employed for a substantially strain-free seal, regardless of the amount of metal and glass used or regardless of the temperatures reached during manufacture, consists of approximately 18% cobalt (Co), 28% nickel (Ni) and 54% iron (Fe), and the glass in this case may consist of 65% silica ($SiO_2$), 23% boric oxide ($B_2O_3$), 7% sodium oxide ($Na_2O$) and 5% aluminum oxide ($Al_2O_3$). Under certain conditions, particularly when the manufacturing temperatures are relatively low and the thickness of the metal of the eyelet relatively small, it is possible to obtain a satisfactory seal when employing for eyelet material, a metal such as molybdenum, copper or nickel in connection with any one of several well-know glasses.

It will be noted in Fig. 3 that the joint between the glass 33 and the eyelet 32 extends for only a limited distance along the interior of the eyelet, leaving a space between the lower edge of the glass and the flanged portion of the eyelet. By positioning the glass as far as possible away from the joint between the eyelet and the header member 3, the danger of disturbing the seal during the welding operation is reduced and considerable flexibility of movement is given to the combined glass and metal members at the seal. This feature is the joint invention of Thomas A. Elder and Albert C. Gable and is claimed in their application Serial No. 240,569, filed November 15, 1938.

In the operation of tubes containing such a seal, there is a relatively large potential difference between the conductor 15 and the eyelet 32. In case a seal projects into the tube, as shown in Figs. 1 and 3, the interior surface of the glass tends to become coated with getter material which is flashed during the evacuation process as described presently, or any other conducting material which may be given off by the cathode or other electrode, so that the effective leakage distance across the glass between the charged metal members is materially reduced and may cause short circuit within the tube, or at least erratic performance. In order to obviate this difficulty, and in accordance with the present invention, the leakage distance between the conductor and the eyelet is made as long as possible without calling for additional work or complication in the sealing operation. In the manufacture of the improved seal, the cylinder 33 is cut from a rod of glass, preferably to such a length that when the eyelet is heated, as explained hereinbefore, the upper portion of the glass cylinder flows over the edge of the eyelet to form a "mushroom" head of flattened configuration with bulging sides.

It is apparent that due to the curved configuration of the member 33, the distance between the conductor 15 and the eyelet, as measured along the upper surface of the glass, is considerably greater than the distance measured transversely across or through the glass in a straight line. The longer the length of excess glass provided during the sealing process up to a certain limit, the greater will be the bulging effect and the greater the leakage distance. Obviously, if the curved glass portions of the seal were subjected to the condensation of getter or electrode material or even to the collection of dust or other foreign matter, there would still be a sufficient length of clean glass to prevent surface leakage It will also be noted that the lower surface of the glass member 33 is not flush with the eyelet and hence is well protected from the accumulation of conducting deposits so that the leakage distance between the charged metal members at this end of the seal is adequate to withstand the potentials involved. In case it is desired to increase the leakage distance at the lower end of the seal, a sleeve extension may be provided, forming an integral part of the glass member 33, as is shown in Fig. 9 which will be described hereinafter.

In addition to these seals, the lower metal header 3 carries a seal-off tubulation 34 constituted preferably of a readily workable metal such as steel which is hermetically secured to the header member in any suitable manner. An excess of tubulation is provided, as indicated by the dotted lines shown in Fig. 1, the additional length being cut off during the seal-off process.

When the leading-in conductor seals and the metal seal-off have been secured to the proper headers, and the electrode assembly, including the frame uprights 20, has been assembled and secured between the headers, connections are made between the various leading-in conductors and their respective electrodes. Thus the metal headers and the electrode structure together with the supporting framework and elements constitute the entire structure contained within the envelope 1.

The feature of providing a pair of metal headers connected together by a rigid framework which supports the electrodes and constitutes a complete assembly unit is disclosed and claimed in my Patent No. 2,056,035, granted September 29, 1936, and assigned to the same assignee as the present invention.

The next step in the process of manufacture is to secure the header members and associated elements to the envelope. The headers are of such a diameter as to fit snugly within the envelope 1, and are so spaced that their outer edges align themselves with the edges of the cylinder 1. The entire unit may be slipped into place and the headers welded or otherwise permanently and metallically secured to the envelope.

The tube is then placed on an exhaust system, and while heated, the interior of the envelope is evacuated through the tubulation 34. The heating operation should be so conducted that the glass member 33 is not caused to melt or that the seal is otherwise deleteriously affected. The tube may be gettered in any suitable and well-known manner (not shown).

When a sufficiently high vacuum has been obtained and a vapor-producing substance or an inert gas introduced, if desired, the tube is sealed from the pump by closing the tubulation 33 in any suitable manner, for example by simultaneously collapsing the tubulation and welding the sides thereof.

Referring more particularly to Figs. 4, 5, 6 and 7, I have shown successive steps in the manufacture of another form of the improved seal in which an increase of leakage distance between the conductor and eyelet is obtained. In these figures, the reference characters correspond as far as possible with the numerals designating similar parts in Figs. 1 and 3. Thus numeral 15 generically designates a typical leading-in conductor which it is desired to hermetically seal in an insulating manner to an eyelet 32, leaving a space between the conductor and the insulating material at the lower end of the insulating material. For this purpose, a round block of metal 35 is provided having a central opening 36 which extends for a considerable distance in the block, and a pair of larger but shallower openings 37 and 38 provided at the upper end (as shown) of the block.

In the fabrication of the seal, the conductor 15 is first slipped into the opening 36, then the glass tubing 39 is introduced into the opening 37, after which the eyelet 32 is slipped over the tubing 39 to rest snugly within the opening 38, assuming that the flange of the eyelet is of only slightly less diameter than the opening 38. The opening through the tubing 39 is preferably considerably larger than the leading-in conductor and the tubing preferably has an exterior diameter considerably less than the interior diameter of the eyelet, as indicated by the longitudinal spaces shown on the drawing. The lower end of the block is temporarily secured, as by screw threads, to a rigid upright rod 40 which is connected to a source of rotating power, for example, a motor, so that when the rod 40 is rotated, as indicated by the arrow, the entire seal assembly is also rotated. A gas jet indicated by a nozzle 41 may be applied to the upper end of the eyelet member while the assembly is being rotated, and it will be found, after a little experience in determining the proper speed of rotation, proper temperature of the gas flame and exact position of the application of the flame, etc., that the glass tubing 39 will melt and settle within the eyelet, spreading itself out in all directions so as to form a hermetic joint between the glass and the eyelet and between the glass and the leading-in conductor. If the length of the tubing 39 is properly gauged, the glass upon melting and settling, will align itself flush with the upper edge of the eyelet, as shown more particularly in Fig. 5. It will be noted that during the heating operation, the lower end of the tubing is protected from the gas flame by the metal block 35 and hence retains its original shape, which necessarily leaves a small but effective annular space between the glass and the conductor and between the glass and the eyelet member. The curved portion of the eyelet flange indicated at 42 and shown in Fig. 5 will be straightened out by the pressure applied during the welding of the eyelet to the header member. Under certain circumstances it may be desirable to increase the leakage distance at the flush end of the seal by providing a cap 43 of glass, shown more particularly in Fig. 6. As illustrated, the cap has a downwardly extending flange, the interior diameter of which is somewhat larger than the outer diameter of the eyelet. The cap is also provided with a central opening to receive the leading-in conductor. When placed over the leading-in conductor 15, adjacent the flush surface of the seal, and heated by a gas flame while being rotated in the block 35, the cap member is fused to the glass tubing 39 and the central opening is also reduced so that the glass is secured to the leading-in conductor. The capped seal in its final form is shown in Fig. 7, and it will be noted that there are extended leakage spaces not only at the lower end of the seal provided by the glass tubing or pant-leg 39 but also at the upper end of the seal, provided by the cap member 43. As in the case of the seal shown in Fig. 5, the flanged portion of the eyelet may be secured either to the upper or lower side of one of the header members.

Instead of using a cap member 43 of glass to increase the leakage distance at the upper end of the seal, an extra amount of leakage distance may be obtained by the use of the glass tubing 39 itself. Thus, in the seal shown in Fig. 8, if the glass tubing 39 were of longer length than that shown in Fig. 4 and further, if the upper end of the tubing were protected from the gas flame by a shield 44, as well as the lower end by the metal block 35, a predetermined portion of the tubing will extend above the upper end of the eyelet and still leave enough glass to settle and spread between the leading-in conductor and the eyelet so as to form a hermetic seal. As stated hereinbefore, the eyelet 32 and the glass tubing 39 are preferably constituted of materials which have substantially the same coefficient of thermal expansion at room temperature and at all temperatures up to and including the melting temperature of the glass. Thus, when the seal is made, there is substantially no strain or stress at any of the temperatures reached either during manufacture of the seal or during the heat treatment of the tube embodying the seal.

In Fig. 9, I have shown the use of an improved seal, not only for carrying the leading-in conductor 15 through the metal header member but also as a spacer or support member for some of the elements contained within the tube. In this figure, the metal cylinder 46, which may constitute a header member similar to the header 2 in Fig. 1, or may constitute an integral part of the metal envelope 1, is provided with a central chamber 47 of smaller diameter than the header and extending rectilinearly with respect to the main portion of the envelope. The chamber 47 is provided with a ledge indicated by the reference character 48 on which rests a mica disk 49 for supporting the upper ends of the grid uprights 12 and 14 and the cathode 4. As shown, the glass tubing 50 extends from the eyelet 32 to which it is sealed in any manner described hereinbefore, to a position abutting the upper side of the disk 49.

As pointed out with respect to Fig. 3, the upper portion of the glass member 50 in Fig. 9 is fabricated in the form of a flattened "mushroom" which provides additional leakage surface between the conductor 15 and the eyelet 32. In this case, the head portion of the seal is positioned on the exterior of the tube and hence is subjected to the collection of dust and other foreign material which tends to reduce the insulation properties of the glass; however, with the increased leakage distance the possibility of short circuit is effectively removed. The lower end of the glass member provides a long leakage path over the outer and inner surfaces of the pant-leg and most effectively prevents any short-circuiting effect due to the deposition or condensation of electrode or getter material. In addition, this lower portion of the glass member serves most conveniently as a support abutment for the mica disk 49 and tends to make the internal electrode structure more rigid.

It will be understood that the envelope 46 in addition to the electrodes 4, 12 and 14, may contain other cooperating electrodes such as an anode (not shown) supported within the envelope in any suitable manner. If desired, the envelope may perform the function of any of the electrodes when suitable and well-known connections are made. It is also apparent that in this figure, the metal wall portion which forms the compartment 47 serves as an electrostatic shield or screen between the upper end of the leading-in conductor 15 and the exterior surface of the anode.

Referring to Figs. 10 to 13 inclusive which show successive steps in the fabrication of still other forms of the improved seal, reference character 51 designates a piece of glass tubing having an internal bore of considerably larger diameter than the size of the conductor 15 and an exterior diameter of approximately the same size as the internal diameter of the eyelet shown in Fig. 12. By placing the tubing 51 and the conductor 15 in a rotating fixture or jig similar to member 35 in Fig. 4 and heating the lower end of the tubing by a gas flame as indicated by the nozzle 41, the lower end of the tubing may be caused to contract and form a fairly thick globule of glass (as shown in Fig. 11) which is hermetically sealed to the conductor. The glass member and conductor may then be placed on top of an eyelet 32 as shown in Fig. 12, and it has been found that when a high frequency coil 52 of any suitable type is placed over the eyelet so as to heat the latter, the tubing 51 will drop into the interior of the eyelet and the glass will spread itself to form a hermetic seal between the glass and the eyelet material. After a little experience, and when the proper dimensions are given to the tubing 51 and the eyelet 32, it is possible to produce a seal in which the glass member 51 extends for only a limited distance into the eyelet 32 leaving a pant-leg projection extending out of the eyelet, as seen more clearly in Fig. 13, to provide a long leakage distance or path between the conductor 15 and the pant-leg and hence, between the conductor and the eyelet. The annular space thus obtained is the result of having the internal diameter of the tubing 51 much larger than the conductor 15. The lower end of the member 51 may also be provided with an annular space or groove, if desired, to reduce surface leakage.

Figs. 14 and 15 show various ways of securing the eyelet 32 of the seal illustrated in Fig. 13, to a metal header. Thus in Fig. 14, the eyelet is welded or otherwise secured to the upper side of the flat portion of the header while in Fig. 15, the eyelet is welded or otherwise secured to the under side of the flat portion of the header.

Fig. 16 shows the application of the seal-illustrated in Fig. 13 to a support member which is insulated from the metal header. In this figure, numeral 53 designates a metal rod or upright which may constitute part of a frame for supporting an electrode. The rod 53 is embedded in the glass mass so that it stops short of the lower surface of the glass member 51, and is not only insulated from the header 3 but is also hermetically sealed to the eyelet.

Figs. 17 to 20 inclusive show the application of the improved seal to a structure in which the glass member is sealed directly to the header or other metal portion of the envelope. A seal of this character is fabricated, first by assembling the glass tubing 54 and a leading-in conductor 15, the member 54 having a bore which is considerably larger than the conductor. The assembly may then be placed in a rotating jig or fixture and a gas flame indicated by the nozzle 41 played on the mid-section of the glass tubing 54 while the assembly is being rotated to cause the glass at the center to move radially inwardly and effect a seal with the conductor 15 and to move outwardly to form a bulge as indicated by the reference character 55 in Fig. 18. The glass member and the metal conductor secured thereto may then be placed in an opening provided in the metal header 3 for sealing thereto. At the opening, the header is provided either at the upper or the lower surface with a lip indicated by reference character 56 so as to provide an extended sealing surface. When a gas flame from the nozzles 41 impinges or strikes the metal header (see Fig. 19), the glass will move downwardly through the opening in the metal header, carrying with it the conductor 15. In order to control and regulate the distance that the glass member 54 is lowered during this operation, a fixture consisting of a block of metal 57 may be provided within the header and having a flat surface located at the correct distance below the header. Thus, as the glass member moves downwardly through the opening during the heat treatment, its lower surface or edge will abut the upper or flat surface of the fixture 57. The finished seal fabricated under these conditions is shown in Fig. 20, and it is apparent that the conductor 15 is hermetically secured to the glass member 54 and the latter, in turn, is hermetically sealed to the metal header 3. Inasmuch as the gas nozzle 41 is directed toward the mid-section of the tubing 54 instead of the end portions, so as to leave an extended leakage path between the conductor 15 and each end of the glass member 54, these spaces are carried through the subsequent heating process shown in Fig. 19 and remain in the final seal as illustrated in Fig. 20. In the seal shown and described in Figs. 17 to 20 inclusive, no eyelet is necessary because the glass contacts directly with the header member 3. In view of the fact that the header member is constituted of metal of considerable thickness, the matter of thermal expansion between the contacting glass and metal parts must be considered. Examples of suitable materials have been given hereinbefore.

It is apparent that all of the seals shown and described may be made by automatic machinery, on a quantity production basis and hence at relatively low cost. These conditions are all necessary if a satisfactory seal, suitable for metal radio receiving tubes is desired, although it will be understood that the improved seals are not limited to small tubes. The various processes involved in the fabrication of the respective seals are not critical and yet a most effective seal from the hermetic standpoint and from the standpoint of increased electrical leakage distance may be produced.

What I claim as new and desire to secure by Letters Patent of the United States, is:

1. The method of manufacturing an electron tube including an envelope having a metallic wall with lead-in wires for the electrodes insulatingly passing through the envelope of the tube, which comprises providing holes in the wall of said envelope, extending outwardly the metal immediately surrounding the hole to form a tubulation integral with the wall of the envelope, extending leading-in wires centrally through said holes, and then molding an insulating material in said tubulations in gas-tight engagement with said tubulations and wires.

2. An electric discharge device comprising an envelope containing an electrode structure, a generally flat metal wall portion forming an integral part of said envelope and provided with a small opening therein, the said opening being provided with a lip which constitutes an integral extension of the metal of the said wall portion, and a leading-in conductor extending through said opening and connected to the said electrode structure, the conductor being supported in the opening by means of a vitreous insulating material which is sealed in gas-tight engagement with the conductor and the said lip of the opening.

3. An electron discharge device comprising an envelope containing electrode structure, a metal header forming a portion of the wall of said envelope and provided with a small opening therein, the said opening having a lip which extends laterally of the plane of said header and which constitutes an integral extension of the metal of the header, a leading-in conductor for the said electrode structure extending through the said opening, and a body of glass interposed directly between the said conductors and the said lip for sealing the opening, the header as a whole being constituted of an alloy of nickel, iron and cobalt, whereby the seal between the said glass and lip is of substantially strain-free character.

JAMES E. BEGGS.